United States Patent [19]

Mai

[11] 4,205,824
[45] Jun. 3, 1980

[54] SUPPORT ASSEMBLY FOR SEMI-TRAILERS OR THE LIKE

[75] Inventor: Erich Mai, 6982 Freudenberg/M.-Kirschfurt, Fed. Rep. of Germany

[73] Assignee: Firma Josef Haamann, Hebe- und Transporttechnik, Fed. Rep. of Germany

[21] Appl. No.: 919,709

[22] Filed: Jun. 27, 1978

[30] Foreign Application Priority Data

Jun. 29, 1977 [DE] Fed. Rep. of Germany ....... 2729293
Apr. 11, 1978 [DE] Fed. Rep. of Germany ....... 2815529

[51] Int. Cl.$^2$ ............................................. B60S 9/08
[52] U.S. Cl. ................................................ 254/86 R
[58] Field of Search ........................... 254/86 R, 86 H; 280/763–766

[56] References Cited

U.S. PATENT DOCUMENTS

| 2,232,187 | 2/1941 | Reid | 254/86 R |
| 3,801,068 | 4/1974 | Kopas | 254/86 R |
| 3,861,648 | 1/1975 | Glassmeyer | 254/86 R |

*Primary Examiner*—Othell M. Simpson
*Assistant Examiner*—Roscoe V. Parker, Jr.
*Attorney, Agent, or Firm*—Jacobi, Lilling & Siegel

[57] ABSTRACT

A support member for semi-trailers or the like comprising two driven spindle-jacks each with two telescoping inner and outer tubing and each with one bevel-gear drive, one of these drives being actuated by spur-gearing itself actuated by a handcrank, the bevel-gear shaft of this bevel-gear drive penetrating the spur-gearing and forming part of same and being supported at the opposite end as well as between its ends in the outer tubing.

6 Claims, 4 Drawing Figures

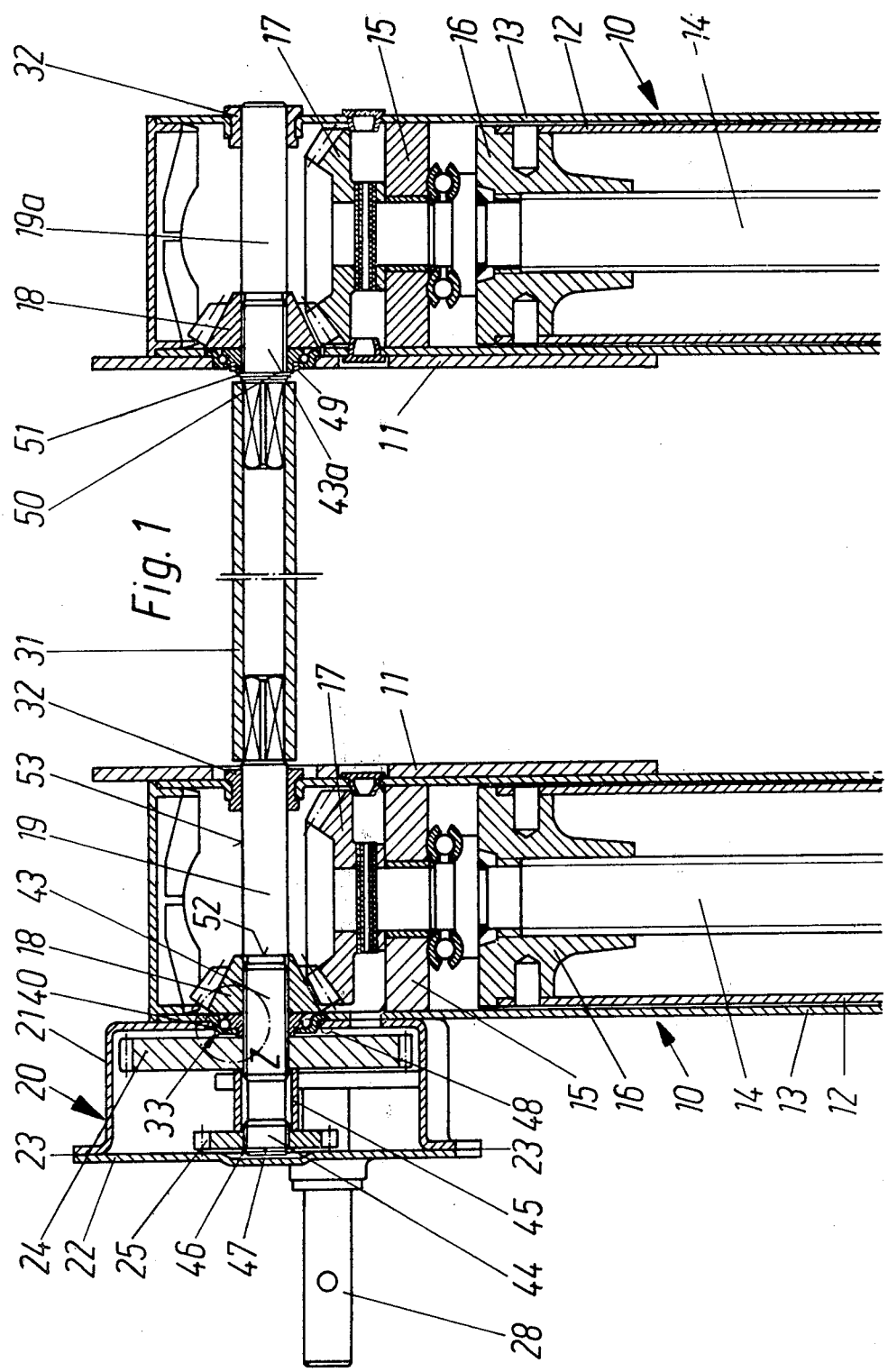

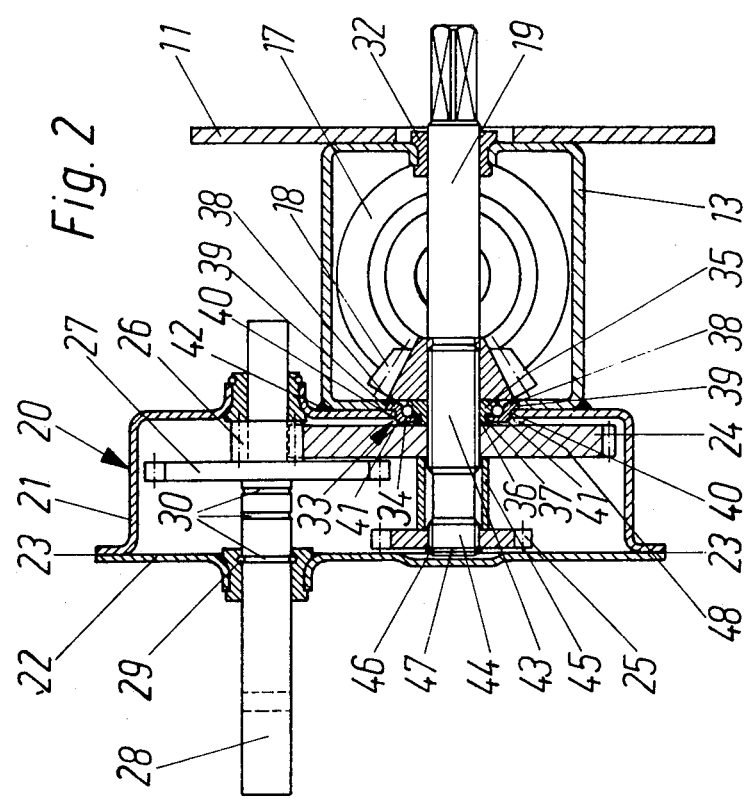

SUPPORT ASSEMBLY FOR SEMI-TRAILERS OR THE LIKE

BACKGROUND OF THE INVENTION

The invention relates to a support assembly for semi-trailers or the like and consists of two driven spindle-jacks each with two telescoping inner and outer tubing and each with one bevel-gear drive, one of these drives being actuated by spur-gearing itself actuated by a handcrank, the bevel-gear shaft of this bevel-gear drive penetrating the spur-gearing and forming part of the same and being supported at the opposite end as well as between its ends in the outer tubing.

It has been conventional practice so far in spindle-jacks used in such support assemblies to support the bevel-gear shaft at one end as well as between its ends in the outer square-section of a spindle-jack and to support it at its other end in the spur-gear drive-housing, and to do this by means of a plurality of sleeve bearing, e.g., three bearings. However, to prevent undue friction and accordingly low efficiency, the sleeve bearings must be carefully aligned in the assembly of the jack, whereby difficulties are encountered in mass production, as the spindle jacks in question are welded together, extruded, molded or rolled components being used in part. For instance the roller outer square-sections may not be satisfactorily right-angular in cross-section. If the sleeve bearings are improperly aligned, the bevel-gear shaft may cant, or the angularly offset seating of the bevel-gear may result in the further drawback that the bevel-gear rests by its shoulder against the inside wall of the outer square tubing and thereby moves within it only on one side, whereby there is degradation in the functioning of the spindle-jack.

SUMMARY OF THE INVENTION

The present invention addresses the problem of eliminating the problems cited above and to create equipment, namely a support-assembly with spindle-jacks, wherein the support of the bevel-gear shaft and the installation of the spur-gearing is simplified under the conditions cited above, and whereby improved functioning and efficiency is achieved.

This problem is solved by the present invention for a support-assembly of the initially discussed type in that the support of the bevel-gear shaft between its ends is achieved using an anti-friction bearing, i.e., a roller or ball bearing, in the form of an annular oblique bearing of which the outer race comprises a radially outward, annular projection at the inside end, the bearing resting by means of said projection in a suitable bore in the outer tubing, in that the spur-gear drive housing by means of a suitable bore plugs in self-centering manner on a shoulder extending from the inside end of the outer race to the outside, and in that the gear and bevel-gear adjacent to the bearing are maintained by the inside race at an axial distance from the outer race and, where appropriate, from the inside wall of the gear housing or the outer tubing.

The annular oblique bearing is fixed in place by means of the annular, outwardly radial projection, and upon subsequent installation of the gearing housing, the latter is properly positioned on the outwardly projecting shoulder of the outer race, so that the input or drive shaft of the spur-gearing is made to assume a position substantially parallel to the bevel-gear shaft, even when for instance the angles made by the sides of the outer square section when viewed in cross-section deviate from the proper angles. After this emplacement of the gearing housing on the outer tube of the spindle-jack, the gearing housing may for instance be welded or screwed on the outer tube. Because the inside race of the bearing maintains the adjacent bevel-gear and the gear axially away from the outer race and from the inside wall of the outer tube, or the gearing housing, the friction is reduced compared to the state of the prior art and the efficiency of the spindle-jack is further improved. The elimination of the previously conventional third support bearing for the bevel-gear shaft in view of its overhung support in turn results in an advantageous simplification in construction. Because of the above steps of the invention a sensible increase in efficiency compared to the prior state of the art is made possible and achieved.

According to a further embodiment of the invention, the bearing is designed to be self-latching by means of a split lock washer on a radially offset, axial extension of the inside race, and the inside race is provided with a toothed spline, whereby an easily installed and dismantled roller bearing is achieved, of which the inside race is reliably moved along by the bevel-gear shaft, which shaft anyway is equipped with bevel-gearing for the rotationally-secure mounting of the bevel-gear and of a further spur-gear, the inside race then also meshing with said bevel gearing.

To prevent erroneous installation of the bearing, a further embodiment of the invention provides, for instance, several wart-like protrusions or the like at the inside of the gearing housing near the bore and inside the outer diameter of the projection at the ouer race of the bearing. These protrusions immediately reveal an erroneous emplacement of the bearing on the bevel-gear shaft because the adjacent spur gears then do not permit being put into their proper assembly positions on the bevel-gear shaft.

The invention may also be implemented in an especially economical manner when the inside and/or outside race of the bearing is an extruded or molded component.

As discussed above, the oblique annular bearing serves both to support the bevel-gear shaft between its ends and as a centering means to emplace the input or drive shaft in the spur-gearing housing parallel to the bevel-gear shaft when assembling the spur-gearing housing to the outer tubing, whereby the gears of the driving unit will properly mesh. When the spur-gearing housing is welded to the outer tubing, it is necessary however to carefully cover the exposed parts of the annular oblique bearing—which at this time is in its assembly position—, to prevent soiling from the welding procedure. It is alternatively possible when assembling the spur-gearing housing to the outer tubing of the spindle-jack, to use first a centering template the shape of the annular oblique bearing in lieu of the actual one, and to remove it after welding and replacing it by the genuine annular oblique bearing. This annular oblique bearing comprises an outer race with two stepped, annular sections, of which only one is centered or matchingly integrated into a bore in the outer tubing or in a bore in the spur-gearing housing, the section with the larger diameter resting against the inside of the outer tubing and/or the outside of the spur-gearing housing. This embodiment offers the advantage that only one particular bore in the outer tubing or spur-gearing housing and only one of the stepped, annular sections of the outer race require precise machining, so that the assembly of the annular tapered bearing into the spindle-jack is simplified. The axial thrust generated by the bevel-gear in spindle-jack operation is transmitted through the outer race to the outer tubing and/or the gearing housing, or reliably absorbed by these components.

A further feature of the invention is that the inside race of the bearing keeps the bevel-gear against a stop on the latter's shaft so as to be precisely meshing with its opposite bevel-gear. Accordingly, the inside race serves advantageously an additional function.

BRIEF DESCRIPTION OF THE DRAWINGS

FIG. 1 is an elevational view, partly in section, of two drive-couple spindle-jacks of a support assembly for semi-trailers;

FIG. 2 is an elevational view, partly in section, of the spur-gearing and of the bevel-gear drive of a spindle-jack;

DESCRIPTION OF THE PREFERRED EMBODIMENTS

Figure 4:
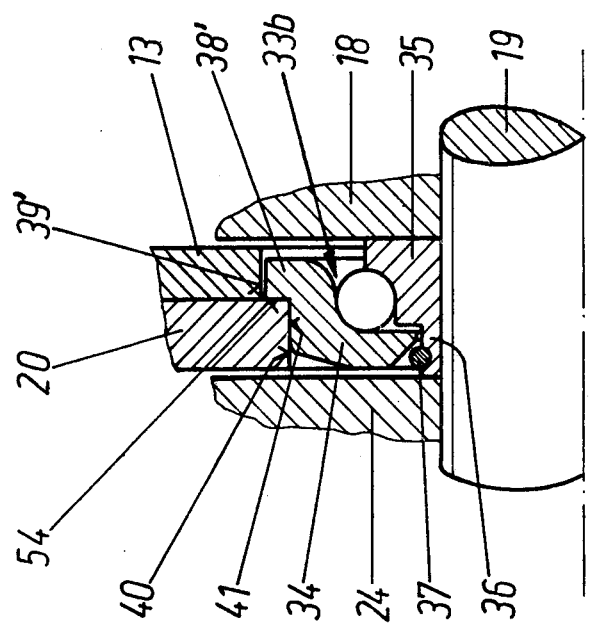
FIG. 4 is a partial sectional view similar to FIG. 3, showing still another embodiment of the invention.

The two spindle-jacks 10, also termed spindle-props, shown in FIG. 1, are of the same design and while spaced apart are fastened by securing-plates 11 to the underside of a semi-trailer at its front part, so that after separating the semi-trailer from its tractive means, it will rest on these spindle-jacks.

Each spindle-jack 10 comprises two relatively displaceable inner and outer, substantially square sections of tubular form 12 and 13, rollers or articulating feet (not shown) being mounted to the lower end of the inside square section 12 to prop the semi-trailer on the ground. The relative motion of the inside and outside square sections is implemented by rotating a threaded spindle 14 which is held axially fixed but rotationally displaceable in a bearing plate 15 welded into the outer square tubing 13 and which holds a nut 16 fastened to the upper end of the inside square tubing 12.

A bevel-gear 17 meshing with another bevel-gear 18 is pinned to the upper end of the threaded spindle 14, bevel-gear 18 being rigidly mounted with respect to relative motion on a bevel-gear shaft 19 and 19a. Bevel-gear shaft 19, as shown in FIG. 1, extends leftwards and into a spur-gearing housing 20 consisting of two molded or stamped pieces 21 and 22, which are joined together at 23. Two gears 24 and 25 are mounted so as to be secured against relative rotation on that part of the bevel-gear shaft 19 which enters the spur-gearing housing 20, one of which (FIG. 2) meshes with gear 24 by means of pinion 26, while gear 25 meshes with gear 27. Pinion 26 and gear 27 are mounted on an axially displaceable drive shaft 28 which can be rotated by a hand-crank (not shown), the various set positions of drive shaft 28 being secured by a spring 29. This spring lock 29 functions by means of annular grooves 30 in drive shaft 28. FIG. 2 shows the spur-gearing in a particular setting corresponding to operation under load. When the equipment is set for rapid (unloaded) operation, gear 27 meshes with gear 25.

FIG. 1 discloses that the bevel-gear shafts 19 and 19a are drive-connected by means of a ganging shaft 31, so that when this shaft rotates, both spindle jacks 10 are actuated simultaneously. However, each spindle-jack may also be provided with its own hand-crank drive.

The bevel-gear shaft 19 is supported at one end in a bearing sleeve 32 mounted to the outside square tubing 13 and furthermore between its ends in a ball bearing 33 which is designed as an annular oblique bearing. That part of the bevel-gear shaft 19 supporting gears 24 and 25 projects freely into gearing housing 20, that is, it "overhangs" or is cantilevered. Bearing 33 is provided with an outer race 34 and an inner race 35, and is designed to remain in place by itself. To that end a split lock-washer 37 is mounted in a corresponding groove on a radially offset, axial extension 36 of the inner race 35. The outer race 34 comprises at its inside end an annular, radially outward projection 38 fitted to and inserted into a bore 39 in the outer square tubing 13. Component 21 of gearing housing 20 is provided with a bore 40 through which passes with a close fit an outwardly extending shoulder 41 of outer race 34. When gearing-housing part 21 is slipped on this shoulder, the required alignment of gears 26 and 27 with respect to gears 24 and 25, respectively, is ensured, shafts 19 and 28 assuming substantially axially parallel positions. After slipping this component 21 onto shoulder 41, component 21 can be connected with the outer square tubing 13, for instance, by welding or bolting, as indicated in FIG. 2 at 42.

Bevel-gear shaft 19 is provided with toothed spline sections 43 and 44; bevel-gear 18, inside race 35 and gear 24 are mounted by means of matching splines on section 43, secured on same against relative rotation, while gear 25 is seated on section 44 with a respective matching spline, also secured against relative rotation. A spacing bush 45 is mounted between gears 24 and 25 and a split lock washer 46 seated in a groove 47 of the bevel-gear shaft 19 secures components 25, 45, 24, 35 and 18 to bevel-gear shaft 19 in the positions shown.

Inside race 35 extends axially in both directions beyond outer race 34, thereby ensuring that bevel-gear 18 and gear 24 are axially spaced from outer race 34. Several wart-like protrusions 48 provided at the inside of component 21 of gearing-housing 20—only one being shown in FIGS. 1 and 2—prevent incorrect assembly of bearing 33.

Bearing 33 is slipped on the splined section 43a of bevel-gear shaft 19a and corresponds to the bearing discussed above. Shoulder 41 of outside race 34 in this case extends however through a bore 49 in the mounting plate 11, and the inner race 35 and the bevel-gear 18 are axially fastened to bevel-gear shaft 19a by means of a split lock-washer 51 mounted in a groove 50 in this instance. In this variation, the inside race 35 again serves to space the bevel-gear 18 laterally away from the outer race 34 to prevent frictional losses.

Figure 3:
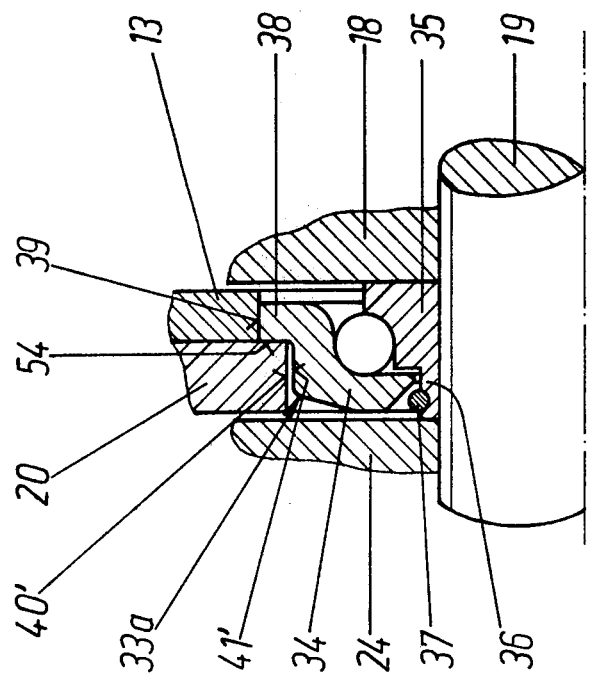
FIG. 3 is an enlarged partial section similar to the cut-out Z in FIG. 1, showing another embodiment of the invention.

The outer race 34 of ball bearing 33a in FIG. 3 is inserted as a close fit by means of its annular section 38 in a bore 39 in the outer square tubing 13, while the annular and offset section 41' of the outer race extends with radial play into a bore 40' of gearing-housing 20. Therefore, only bore 39 and the outer circumference of section 38 require precise machining. The required coaxial arrangement of bores 39 and 40' and of the bore seating the bearing sleeve 32 (FIG. 1) is implemented by using a template (not shown) corresponding to the annular oblique bearing 33a when welding the gearing-housing 20 to the outer square tubing 13, or alternatively by first welding the gearing-housing to the outer square tubing and then machining in one stage all the bores for the bevel-gear shaft 19, for instance, by means of a step-drill, namely axially parallel to the drive shaft 28 of the spur-gearing.

Whereas in the embodiment of FIG. 3, the annular section 38 with the larger diameter is installed in close fitting manner into bore 39 of the outer square tubing 13, the offset annular section 41 according to the embodiment of FIG. 1 and comprising the ball bearing 33b, and of a smaller diameter, is installed centered or ready-to-match in bore 40 of the spur-gearing housing 20. Between section 38' with the larger diameter and bore 39', there is a radial play, that is, neither section 38' nor bore 39' require precise machining.

According to a further characteristic of the invention, the inner race 36 keeps the bevel-gear 18 forced against a stop 52 formed by the left rim of an enlarged-diameter section 53 of the bevel-gear shaft 19, whereby precise meshing between bevel gears 18 and 17 is ensured. The axial thrusts exerted when operating the spindle-jack by bevel-gear 18 toward the spur-gearing are transmitted by the inner race 35, by the balls of the annular oblique bearing and by the outer race 34 to gearing-housing 20 and are absorbed by it, because the annular section 38 of outer race 34 with the larger diameter fully rests against the outside 54 of this housing (FIGS. 3 and 4). The above description also applies to the annular oblique bearing 33 slipped on the splined section 43a of bevel-gear shaft 19a.

I claim:

1. In a support assembly for semi-trailers or the like, comprising two drive-connected spindle-jacks each with two telescoping inner and outer tubing and each with one bevel-gear drive, one of which is actuated by spur-gearing itself actuated by a hand-crank, the bevel-gear shaft of one bevel-gear drive entering the spur-gearing and forming part of same and being supported at the opposite end as well as between its ends in the outer tubing, the spur-gearing being arranged within a spur-gearing housing, the improvement wherein:

the support of the bevel-gear shaft (19) takes place between its ends by means of an anti-friction bearing (33) in the form of an annular oblique bearing of which the outer race (34) comprises an annular, outwardly radial projection (38) by means of which the bearing rests in a fitted bore (39) in the outer tubing, the spur-gearing housing (20) is slipped by means of a fitted bore (40) in self-centering manner on a shoulder (41) of the outer race (34), said shoulder (41) extending outwardly from the outer tubing (13) and the spur gear (24) adjacent to bearing (33) and the bevel-gear (18) being kept spaced axially from the outer race (34), from the inside wall of the gearing housing (20) and from the outer tubing (13) by means of the inner race (35).

2. The support assembly of claim 1, characterized in that the outer race (34) is designed to be automatically kept in position on a radially offset, axial extension (36) of the inner race (35) by means of a split lock-washer (37), and in that the inner race (35) is provided with a toothed spline.

3. The support assembly of claim 1, characterized in that several protrusions (48) are provided on the inside of the gearing housing (20) near bore (40) and inside the outer diameter of projection (38) at the outer race (34) of the ball bearing.

4. The support assembly of claim 1, characterized in that the inner and outer races (35, 34) of the bearing (33) are molded, stamped or extruded.

5. In a support assembly for semi-trailers or the like, consisting of two drive-connected spindle-jacks, each with two telescoping inner and outer tubes, the outer tube having a bore therein, and each with one bevel-gear drive, one of which is actuated by a spur-gearing in turn actuated by a hand-crank, the bevel-gear shaft of one bevel-gear drive entering the spur-gearing and forming part of same and being supported at the opposite end as well as between its ends in the outer tube, the spur-gearing having a housing with a bore therein, the improvement wherein:

the bevel-gear shaft (19) is supported between its ends by an anti-friction bearing (33a, 33b) in the form of an annular, oblique bearing of which the outer race (34) comprises two annular, stepped sections (38, 38', 41, 41'), only one of the annular, stepped sections (38 or 41) being machined to precisely fit in the bore (39) in outer tube (13) or in the bore (40) in the spur-gearing housing (20), and the other of said annular, stepped sections (38 or 41) being received within the bore (39) in the outer tube or in the bore (40) in the spur-gearing housing (20) with radial play, the larger-diameter section (38, 38') resting against the outside of the spur-gearing housing (20).

6. The support assembly of claim 5, characterized in that the inside race (35) of bearing (33) keeps the bevel-gear (18) precisely meshing with its opposite bevel-gear (17) by holding both against a stop (52) on bevel-gear shaft (19).

* * * * *